(12) United States Patent
Garcia Tormo et al.

(10) Patent No.: US 10,164,533 B2
(45) Date of Patent: Dec. 25, 2018

(54) CONVERTER CIRCUIT FOR REDUCING A NOMINAL CAPACITOR VOLTAGE

(71) Applicant: KONINKLIJKE PHILIPS N.V., Eindhoven (NL)

(72) Inventors: Albert Garcia Tormo, Eindhoven (NL); Peter Lürkens, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/751,051

(22) PCT Filed: Aug. 4, 2016

(86) PCT No.: PCT/EP2016/068692
§ 371 (c)(1),
(2) Date: Feb. 7, 2018

(87) PCT Pub. No.: WO2017/025443
PCT Pub. Date: Feb. 16, 2017

(65) Prior Publication Data
US 2018/0226888 A1    Aug. 9, 2018

(30) Foreign Application Priority Data

Aug. 11, 2015 (EP) .................................. 15180469

(51) Int. Cl.
*H02M 3/158* (2006.01)
*H02M 1/34* (2007.01)

(52) U.S. Cl.
CPC .............. *H02M 3/158* (2013.01); *H02M 1/34* (2013.01)

(58) Field of Classification Search
CPC ..... H02M 2001/009; H02M 2001/344; H02M 2001/348; H02M 1/08; H02M 1/34; H02M 3/157; H02M 3/158; H02M 3/33561
See application file for complete search history.

(56) References Cited

U.S. PATENT DOCUMENTS 5,914,588 A * 6/1999 Jiang .................. H02M 1/4208
                                                   323/267
2007/0040538 A1    2/2007 Lipesei
(Continued)

FOREIGN PATENT DOCUMENTS

CN    101674014 A    3/2010
WO    2006051450 A2   5/2006
WO    2014169388 A1  10/2014

*Primary Examiner* — Emily P Pham
*Assistant Examiner* — Shahzeb K Ahmad
(74) *Attorney, Agent, or Firm* — Larry Liberchuk

(57) ABSTRACT

The present invention relates to a converter circuit (1) for reducing a nominal capacitor voltage, the converter circuit (1) comprising: an input node ($TI_1$), which is configured to receive an input voltage ($V_G$); an output node ($TO_1$; $TO2$), which is configured to supply an output voltage ($V_O$) to a load ($R_{L1}$; $R_{L2}$); and a capacitor ($C_1$; $C_2$), which is coupled to the load so that the input voltage is divided between the capacitor ($C_1$; $C_2$) and the load ($R_{L1}$; $R_{L2}$) and which is configured to be charged up to a voltage corresponding to a differential voltage between the input voltage ($V_G$) and the output voltage ($V_O$).

5 Claims, 3 Drawing Sheets

(56) References Cited

U.S. PATENT DOCUMENTS

| | | | |
|---|---|---|---|
| 2009/0066311 A1 | 3/2009 | Luerkens | |
| 2010/0219801 A1* | 9/2010 | Yonezawa | H02M 3/156 323/282 |
| 2013/0027126 A1* | 1/2013 | Jayaraman | H02M 3/158 327/547 |
| 2015/0097546 A1* | 4/2015 | Pan | H02M 3/158 323/311 |
| 2017/0155342 A1* | 6/2017 | Deboy | H02J 3/383 |
| 2017/0331368 A1* | 11/2017 | Koniakowsky | H02M 1/08 |

* cited by examiner

CONVERTER CIRCUIT FOR REDUCING A NOMINAL CAPACITOR VOLTAGE

CROSS-REFERENCE TO PRIOR APPLICATIONS

This application is the U.S. National Phase application under 35 U.S.C. § 371 of International Application No. PCT/EP2016/068692, filed on Aug. 4, 2016, which claims the benefit of European Patent Application No. 15180469.7, filed on Aug. 11, 2015. These applications are hereby incorporated by reference herein.

FIELD OF THE INVENTION

The present invention relates to the field of power supplies. In particular, the present invention relates to a converter circuit for reducing a nominal capacitor voltage.

BACKGROUND OF THE INVENTION

Many high-power devices require a pre-conditioner stage, a DC-to-DC power converter which allows the high-power device to operate with a wide range of input voltages. A representative example of a high-power device is a High-Voltage Generator, HVG, widely used in medical applications such as X-ray or magnetic resonance imaging, MRI. HVGs deliver powers in the range of 80 kW.

The pre-conditioner is generally supplied with a raw unregulated voltage, often a rectified three-phase main voltage. The specifications for the pre-conditioner may require it to handle a wide range of input voltages, such as nominal value plus/minus 50%. The output voltage, however, must be well regulated; the specifications may set a maximum peak-to-peak ripple in the range of for instance 5%. And these specifications must be fulfilled whilst delivering high power, even beyond 100 kW.

Because of the high power, linear regulation is unfeasible. When implementing such a pre-conditioner with a switched-mode power supply, all power components are subdued to high stress.

EP 1815582 B1 describes a pre-conditioner circuit having input terminals for receiving an input voltage, said pre-conditioner being for modifying said input voltage for application to a load, the pre-conditioner circuit comprising at least two pre-conditioner modules, each having an input and an output for connection to a respective load module.

SUMMARY OF THE INVENTION

There may be a need to improve switched-mode converter topology. These needs are met by the subject-matter of the independent claims. Further exemplary embodiments are evident from the dependent claims and the following description.

An aspect of the present invention relates to a converter circuit for reducing a nominal capacitor voltage. The converter circuit comprises an input node, which is configured to receive an input voltage; a first output node and a second output node, which are configured to respectively supply a first output voltage and a second output voltage to respectively a first load and a second load. The converter circuit comprises a first inductor which is coupled between the first output node and a first selection node and a second inductor which is coupled between the second output node and a second selection node. A first switch is configured to connect the first selection node to either the second output node or ground and a second switch is configured to connect the second selection node to either the first output node or the input voltage node. A first capacitor is coupled to the first load so that the input voltage is divided between the first capacitor and the first load and which is configured to be charged up to a voltage corresponding to a differential voltage between the input voltage and the first output voltage. A second capacitor is coupled to the second load so that the input voltage is divided between the second capacitor and the second load and which is configured to be charged up to a voltage corresponding to a differential voltage between the input voltage and the second output voltage. The first capacitor is coupled between the first load and ground; and the second capacitor is coupled between the second output node and the input node configured to receive the input voltage.

In other words, the capacitor of the power converter is charged to the voltage difference of the input voltage and the output voltage instead of that the capacitor is charged to the output voltage. The input voltage is the voltage which is provided to the converter, the output voltage corresponds to the voltage that is provided by the converter to a load, there may also be more than one load, resulting in more than one output voltage.

In other words, also the voltage stress of the power switches is reduced improving switching performance and switching characteristics of the switches and improving the service time as well as the endurance of the switches.

The load and the capacitor of the power converter are connected so that the supply voltage is divided between the load and the capacitor. In this way each of these elements handles lower voltage.

In other words, the capacitor of the power converter and the load are coupled in that a voltage divider is provided in form of a circuit that divides the input voltage into two voltages: at first, the output voltage provided to the load and representing a first fraction of the input voltage, and, secondly, a capacitor voltage that is provided to the capacitor, representing a second fraction of the input voltage. The voltage division is the result of distributing the input voltage among the components of the divider, e.g. the load and the capacitor.

A further, second aspect of the present invention relates to a high-voltage supply module comprising a converter circuit according to the first aspect or according to any implementation form of the first aspect, wherein the high-voltage supply module is configured to provide the output voltage received from the converter circuit as a high voltage supply to a load.

According to the present invention, the capacitor is coupled between the load and a ground. This advantageously allows using a capacitor with reduced proof voltage or reduced dielectric strength or reduced nominal capacitor voltage.

According to the present invention, the capacitor is coupled between the load and the input node configured to receive the input voltage. This advantageously allows reducing the nominal voltage of the capacitor.

According to the present invention, a first capacitor of the two capacitors is coupled between a first load of the two loads and a ground wherein a second capacitor of the two capacitors is coupled between a second load of the two loads and the input node. This advantageously allows using low voltage components or low voltage capacitors.

According to the present invention, the converter circuit comprises an inductor. This advantageously allows performing the power conversion by periodically storing and releasing of energy in form of magnetic energy.

According to the present invention, the converter circuit comprises a switch. This advantageously allows controlling the power conversion process as performed by the periodically storing and releasing of energy in the reactive components.

According to an exemplary embodiment of the present invention, the converter circuit is an interleaved buck converter and the converter circuit comprises: two inductors and two switches.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

A more complete appreciation of the present invention and the attendant advantages thereof will be more clearly understood by reference to the following schematic drawings, which are not to scale, wherein.

DETAILED DESCRIPTION OF EMBODIMENTS

Figure 1:
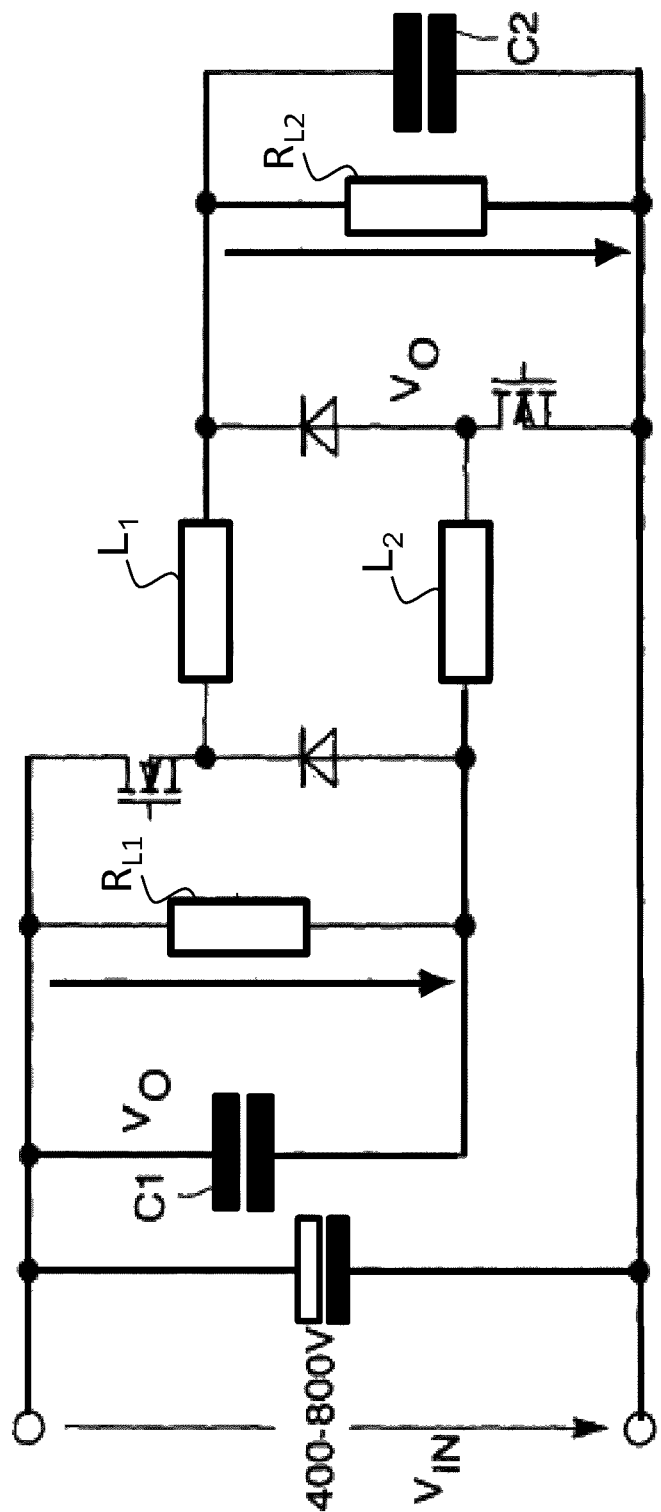
FIG. 1 shows a schematic diagram of an interleaved buck converter topology for explaining the present invention.

The illustration in the drawings is purely schematic and does not intend to provide scaling relations or size information. In different drawings or figures, similar or identical elements are provided with the same reference numerals.

Generally, identical parts, units, entities or steps are provided with the same reference symbols in the description.

The technical solutions in the embodiments of the present invention are described clearly and completely in the following with detailed reference to the accompanying drawings in the embodiments of the present invention.

FIG. 1 shows a schematic diagram of an interleaved buck converter topology for explaining the present invention.

Switched-mode power converters perform the power conversion by periodically storing and releasing energy within reactive components; this process is controlled by power switches.

Different power converter topologies, for instance buck converters, boost converters, buck-boost converters, or full-bridge converters, store the energy within an inductor, i.e. they provide energy storage in the magnetic field originating from the current flowing through the winding of the inductor.

The capacitors $C_1$, $C_2$ and the switches S1, S2 are connected in parallel with the loads, so they are subdued to a regulated voltage of value $V_O$ regardless of the supply voltage $V_{IN}$. The total output current is partially shared between both loads $R_{L1}$, $R_{L2}$, which also minimizes the current in the inductors $L_1$, $L_2$.

As a result, the stress in the power components is much lower than that in a regular implementation based on independent buck converters, e.g. all switches would then be subdued to the total supply voltage.

The further reference signs as shown in FIG. 1 are discussed and described in detail in connection with FIG. 2 in the following.

Figure 2:
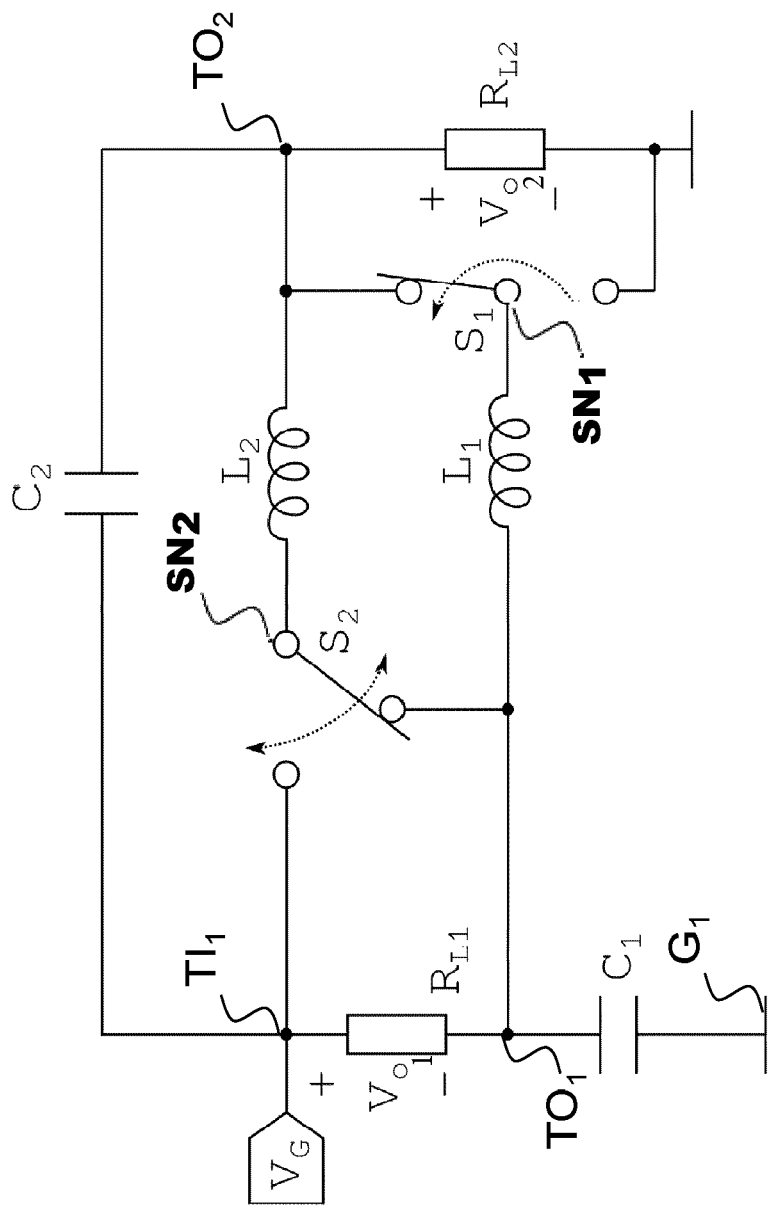
FIG. 2 shows a schematic diagram of a converter circuit for reducing a nominal capacitor voltage according to an example.

FIG. 2 shows a schematic diagram of a converter circuit for reducing a nominal capacitor voltage according to an exemplary embodiment of the present invention. The basic operation of the converter circuit in form of an interleaved buck converter has the current in two inductors $L_1$, $L_2$ controlled by two switches $S_1$, $S_2$.

FIG. 2 shows a converter circuit for reducing a nominal capacitor voltage, the converter circuit comprises an input node $TI_1$, two output nodes $TO_1$, $TO_2$, two loads $R_{L1}$, $R_{L2}$, two capacitors $C_1$, $C_2$, two power switches S1, S2. The input node $TI_1$ is configured to receive an input voltage $V_G$, which is provided to the converter circuit.

The output nodes $TO_1$, $TO_2$ are configured to supply an output voltage $V_O$ to the two loads $R_{L1}$, $R_{L2}$.

The two loads $R_{L1}$, $R_{L2}$ are configured to receive the output voltages $V_O$.

The load $R_{L2}$ and the capacitor $C_2$ are connected so that the supply voltage is divided between the capacitor $C_2$ and the load $R_{L2}$; in this way each of these elements handles lower voltage. In other words, the capacitor $C_2$ is connected between the input node $TI_1$ and the output node $TO_2$.

The two capacitors $C_1$, $C_2$ are coupled to the two loads $R_{L1}$, $R_{L2}$ and are configured to be charged up to a voltage corresponding to a differential voltage between the input voltage $V_G$ and the output voltage $V_{O1}$ or $V_{O2}$.

According to the present invention, the converter circuit 1 comprises two inductors $L_1$, $L_2$. The first inductor L1 is coupled between the first output node $TO_1$ and a first selection node $SN_1$ and the second inductor L2 is coupled between the second output node $TO_2$ and a second selection node $SN_2$.

According to the present invention, the converter circuit comprises two switches $S_1$, $S_2$. The two switches $S_1$, $S_2$ may be switching elements, e.g. transistors, the two switches $S_1$, $S_2$ may be provided by metal-oxide-semiconductor field-effect transistor (MOSFET, MOS-FET, or MOS FET) or by n-channel IGFETs (Insulated Gate Field Effect Transistor) or by diodes. The first switch $S_1$ is configured to connect the first selection node $SN_1$ to either the second output node $TO_2$ or ground $G_1$ and the second switch $S_2$ is configured to connect the second selection node $SN_2$ to either the first output node $TO_1$ or the input voltage node $V_G$; and According to an exemplary embodiment of the present invention, a first capacitor $C_1$ may be coupled between the first load $R_{L1}$ and a ground $G_1$.

According to an exemplary embodiment of the present invention, the specifications for the capacitors are reduced with regard to the maximum voltage the capacitors have to tolerate.

According to an exemplary embodiment of the present invention, more precisely, the capacitors are charged to $V_G$-$V_{O1}$ or $V_G$-$V_{O2}$. For example, if $V_G$=600 V—the voltage supplied to the converter or the input voltage—and $V_{O1}$=400 V—the voltage supplied by the converter or the output voltage—, the capacitors would be charged to 400 V in a conventional topology as shown in FIG. 1, whereas the capacitors as used in the topology as shown in FIG. 2 are charged to only 200 V, i.e. the difference $V_G$-$V_{O1}$.

According to an exemplary embodiment of the present invention, the capacitors are coupled between the load and a controlled voltage instead of in parallel with the load. As described above, the capacitors are now charged to $V_G$-$V_{O1}$ or $V_G$-$V_{O2}$.

According to an exemplary embodiment of the present invention, the voltages $V_O$ in the different loads $R_{L1}$, $R_{L25}$ i.e. the voltages $V_O$ provided as the output voltages do not need to be the same, in other words the converter circuit 1 may provided different output voltages $V_O$ at the same time to different loads $R_{L1}$, $R_{L2}$. Even if the output voltages $V_O$ of these different loads $R_{L1}$, $R_{L2}$ are not the same, the capacitors $C_1$, $C_2$ still benefit from a reduced voltage anyway. The only difference is that the capacitors $C_1$, $C_2$ would be charged to different voltages as well.

Figure 3:
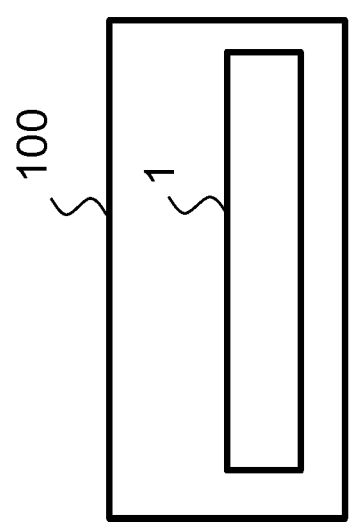
FIG. 3 shows a schematic diagram of a high-voltage supply module according to an example.

FIG. 3 shows a schematic diagram of a high-voltage supply module according to an exemplary embodiment of the present invention.

A high-voltage supply module 100 may comprise a converter circuit 1 with reduced nominal capacitor voltages.

The converter circuit 1 may be used in any dual-output switched-mode power supply. In particular, the converter circuit 1 may be used for pre-regulators which handle high power.

According to an exemplary embodiment of the present invention, the converter circuit 1 may be used in a pre-conditioner stage, a DC-to-DC power converter which allows the high-power device to operate with a wide range of input voltages.

According to an exemplary embodiment of the present invention, the high-voltage supply module 100 may be configured to provide the output voltage VO received from the converter circuit 1 as a high voltage supply to a load RL1; RL2.

According to an exemplary embodiment of the present invention, the high-voltage supply module 100 may be a device for the conversion of available power of one set of characteristics to another set of characteristics to meet specified requirements.

It has to be noted that embodiments of the present invention are described with reference to different subject-matters. In particular, some embodiments are described with reference to method type claims whereas other embodiments are described with reference to device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined comprising synergetic effects that are more than the simple summation of these features.

While the present invention has been illustrated and described in detail in the drawings and the foregoing description, such illustration and description are to be considered illustrative or exemplary and not restrictive; the present invention is not limited to the disclosed embodiments.

Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims.

The mere fact that certain measures are recited in mutually different dependent claims does not indicate that a combination of these measures cannot be used to advantage. Any reference signs in the claims should not be construed as limiting the scope.

The invention claimed is:

1. A converter circuit for reducing a nominal capacitor voltage, the converter circuit comprising:
   an input node configured to receive an input voltage;
   a first output node and a second output node, which are configured to, respectively, supply a first output voltage and a second output voltage to, respectively, a first load and a second load;
   a first inductor coupled between the first output node and a first selection node;
   a second inductor coupled between the second output node and a second selection node;
   a first switch configured to connect the first selection node to the second output node or ground;
   a second switch configured to connect the second selection node to the first output node or the input voltage node;
   a first capacitor coupled to the first load so that the input voltage is divided between the first capacitor and the first load, the first capacitor being configured to be charged up to a voltage corresponding to a differential voltage between the input voltage and the first output voltage;
   a second capacitor coupled to the second load so that the input voltage is divided between the second capacitor and the second load, the second configured to be charged up to a voltage corresponding to a differential voltage between the input voltage and the second output voltage;
   wherein the first capacitor is coupled between the first load and ground; and
   wherein the second capacitor is coupled between the second output node and the input node configured to receive the input voltage.

2. The converter circuit according to claim 1, wherein the first load is connected between the input node and the first output node.

3. The converter circuit according to claim 1, wherein the second load is connected between the second output node and ground.

4. The converter circuit according to claim 1, wherein the converter circuit an interleaved buck converter.

5. A high-voltage supply module, comprising a converter circuit for reducing a nominal capacitor voltage, the converter circuit comprising:
   an input node configured to receive an input voltage;
   a first output node and a second output node, which are configured to, respectively, supply a first output voltage and a second output voltage to, respectively, a first load and a second load;
   a first inductor coupled between the first output node and a first selection node;
   a second inductor coupled between the second output node and a second selection node;
   a first switch configured to connect the first selection node to the second output node or ground;
   a second switch configured to connect the second selection node to the first output node or the input voltage node;
   a first capacitor coupled to the first load so that the input voltage is divided between the first capacitor and the first load, the first capacitor being configured to be charged up to a voltage corresponding to a differential voltage between the input voltage and the first output voltage;

a second capacitor coupled to the second load so that the input voltage is divided between the second capacitor and the second load, the second capacitor configured to be charged up to a voltage corresponding to a differential voltage between the input voltage and the second output voltage, wherein the first capacitor is coupled between the first load and ground, wherein the second capacitor is coupled between the second output node and the input node configured to receive the input voltage, and wherein the high-voltage supply module is configured to provide the output voltage received from the converter circuit as a high voltage supply to a load.

* * * * *